United States Patent Office 3,236,337
Patented Feb. 22, 1966

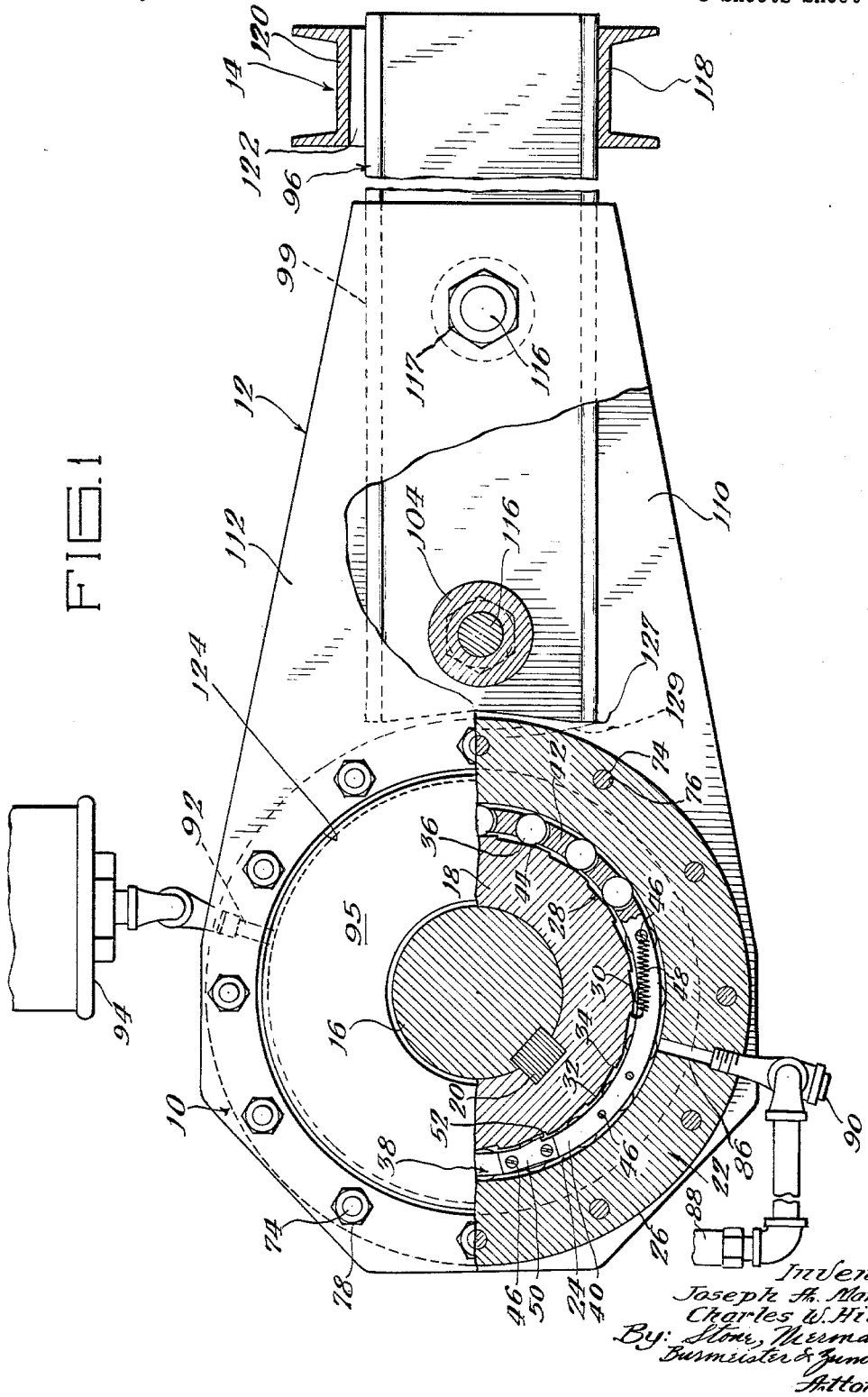

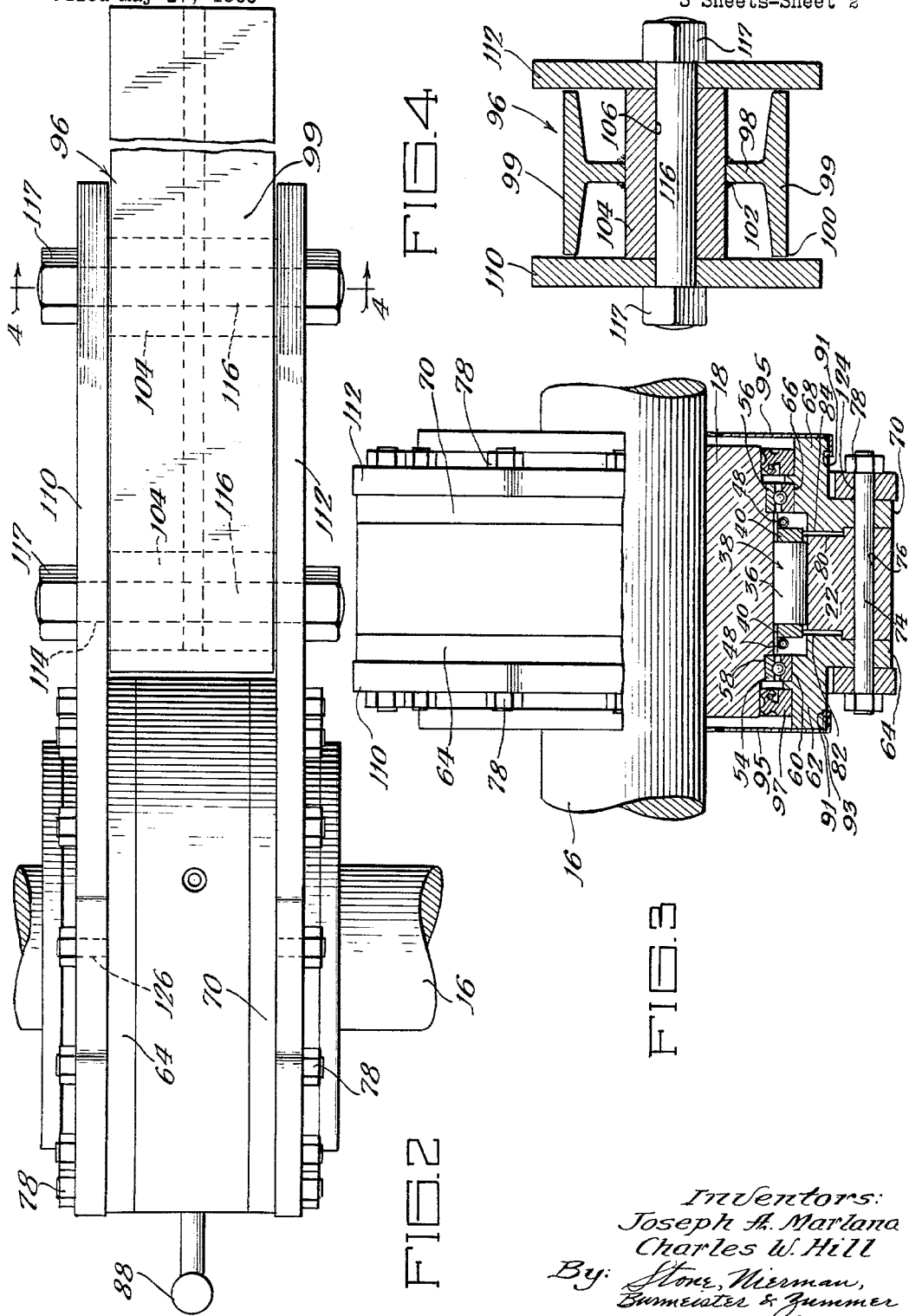

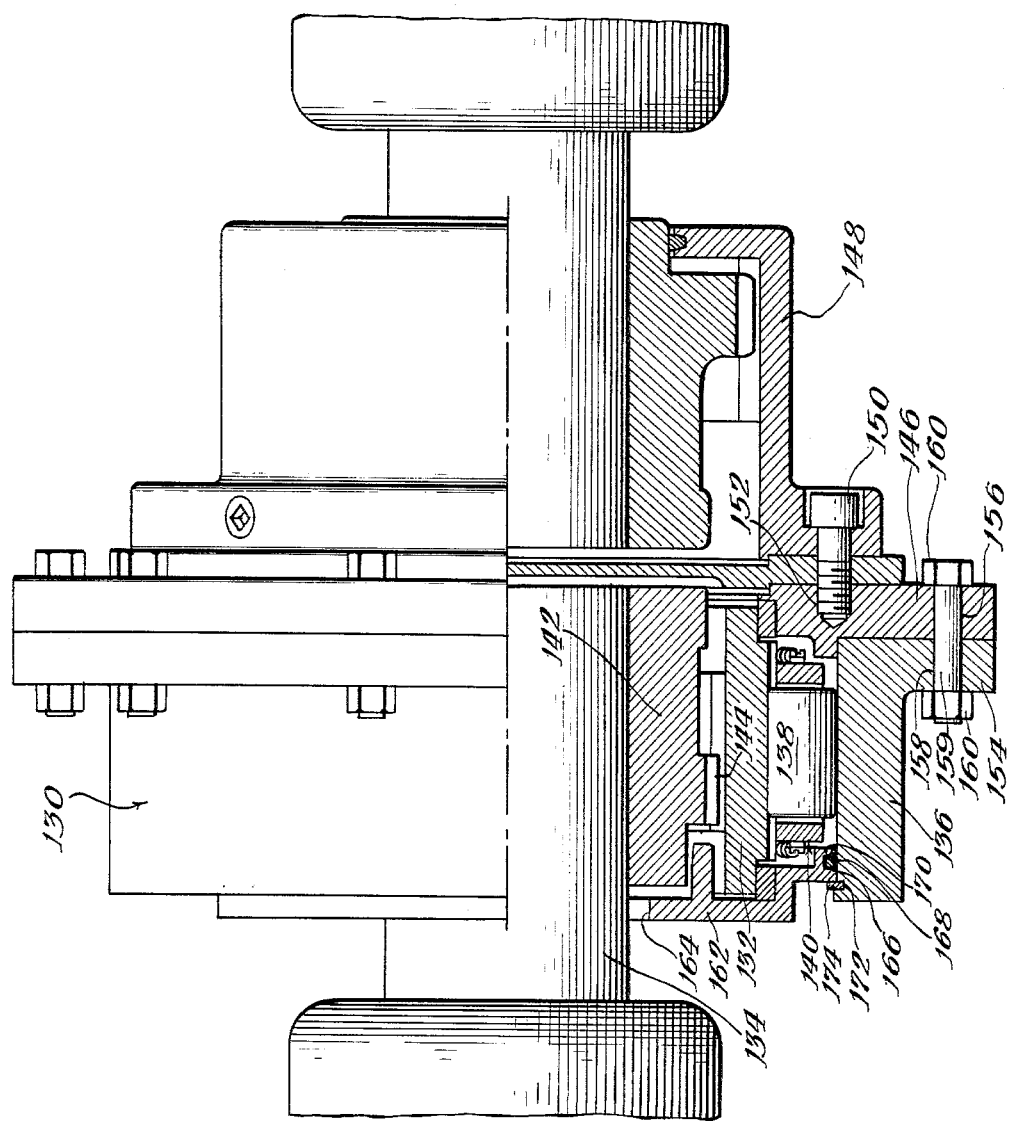

3,236,337
ONE-WAY BACKSTOP
Joseph A. Marland and Charles W. Hill,
La Grange, Ill.
Filed May 17, 1963, Ser. No. 281,217
7 Claims. (Cl. 188—82.84)

The present invention relates to backstops which operate on rotatable shafts, and more particularly to backstops which utilize one-way brakes.

Patent No. 2,865,474 entitled "One-Way Automatic Backstops" of Joseph A. Marland discloses an automatic backstop which utilizes a one-way brake. The one-way brake has an inner race which is mechanically coupled to a rotatable shaft of a unit which is desired to be limited to rotation in one direction. The one-way brake also has an outer race which is anchored and a plurality of brake elements are disposed between the inner and outer races which permit rotation of the inner race relative to the outer race in only one direction. In the one-way brake set forth in Patent No. 2,865,474, the outer race has a cylindrical inner surface and the brake elements are cylindrical rollers, each of which is disposed adjacent to an inclined plane on the outer surface of the inner race. The inclined planes are formed by a plurality of indentations, one for each roller, and the rollers are permitted to rotate when disposed adjacent to one end of the inclined planes but wedge between the inner and outer races when disposed adjacent to the other end of the inclined planes. One-way brakes which use sprags and have confronting cylindrical surfaces on the inner and outer races may also be used in the present invention.

The present invention constitutes an improvement over the one-way automatic backstop set forth in Patent No. 2,865,474. In this patent, two channel arms are disposed parallel to each other and mounted on the outer race of the one-way clutch by a plurality of bolts which are tapped into the cylindrical outer race about its perimeter. Each channel member is mounted on one end of the cylindrical outer race, and in order for the central axes of the two channel members to be disposed on the same radial plane of the inner and outer race, it is necessary to tap the outer race in a precise location. This is particularly true since the end of the channel members may be disposed from approximately four to eight feet from the center of the inner race and outer race, and in the event the channel members have their longitudinal axes disposed on different radial planes, an unequal transverse loading will be placed upon the brake bearings between the cam and the outer race. It is one of the objects of the present invention to provide a one-way automatic backstop with a one-way brake and an elongated member mounted on the clutch for anchoring the brake which inherently avoids an unequal transverse loading on the brake bearings and which may be readily and inexpensively manufactured.

It is also an object of the present invention to provide a one-way automatic backstop with an elongated member mounted on a one-way brake in which the means for mounting the elongated member or arm on the brake does not weaken the ability of the one-way clutch to withstand torque. In the construction shown in Patent No. 2,865,-474, the mounting of the channel arms by means of tapped bolts results in cracks in the outer race in the event excessive torque is placed upon the one-way backstop.

It ish a further object of the present invention to provide a one-way backstop with an elongated arm and a one-way brake in which excessive torque applied to the backstop unit will cause the elongated arm to break free from the one-way brake, thereby protecting the one-way brake and rendering repair of the backstop relatively simple.

It is also an object of the present invention to provide a one-way brake with an inner and an outer race and a mechanism for mounting the outer race to a torque carrying member which does not weaken the outer race of the one-way brake. It is thus an object of the present invention to provide a one-way brake with an inner and an outer race in which the outer race is constructed of less material to withstand a given torque than one-way brakes of prior constructions.

These and further objects of the present invention will become readily apparent to those skilled in the art from a further consideration of this disclosure, particularly when viewed in the light of the drawings, in which:

FIGURE 1 is a front elevational view of a one-way backstop constructed according to the teachings of the present invention, the lower portion of the figure being broken away and shown in section;

FIGURE 2 is a plan view of the backstop of FIGURE 1;

FIGURE 3 is a side elevational view of the one-way brake of the backstop of FIGURES 1 and 2, the lower portion being broken away and shown in section;

FIGURE 4 is a sectional view taken along the line 4—4 of FIGURE 2; and

FIGURE 5 is a side elevational view of a one-way brake constructed according to the teachings of the present invention, the lower portion thereof being broken away and shown in section.

As indicated in FIGURES 1 and 2, the backstop has essentially three parts, namely, a one-way brake 10, a channel arm structure 12 mounted on the one-way brake 10, and an anchor 14 mounted on a foundation affixed to the earth. The automatic backstop operates on a shaft 16 which is secured along the axis of the inner race 18 of the one-way brake 10 by means of a key 20.

The one-way brake 10 also has an outer race 22 which is cylindrical in both its inner surface 24 and its outer surface 26. The inner race 18 has a generally cylindrical surface confronting the cylindrical surface 24 of the outer race 22, and this surface is provided with a plurality of indentations 28 which form inclined planes. The indentations 28 have a flat portion 30 disposed parallel to the axis of the inner race 18 and extending an equal distance from the leading edge 32 to the trailing edge 34 of each flat portion 30. The flat portions 30 are at the same angle relative to a radial plane of the inner race 18 intersecting the leading edge 32 of each identation.

A plurality of rollers 36 are disposed between the inner race 18 and the outer race 22, one roller 36 being disposed between each identation 28 and the outer race 22. The rollers are mounted in a yoke or cage 38 which is formed by a pair of outer rings 40 which extend about the ends of the rollers 36 and a plurality of spacers 42, one spacer being disposed between each pair of adjacent rollers 36. The spacers 42 have concave surfaces 44 confronting each roller and are mounted at their ends on the rings 40 by means of bolts 46. The cage 38 is spring biased on the inner race 18 by a spiral spring 48 mounted on one of the bolts 46 at one end and on the inner race at the other end in order to spring bias the rollers toward the leading edge 32 of the flat surfaces 30 of the indentations 28. Also, a plate 50 is mounted on the yoke 38 by two of the bolts 46 and has a protruding tooth 52 which is adapted to abut the trailing edge 34 of one of the indentations in order to limit translation of the yoke 38 in the free wheeling direction, and thus make certain that the rollers 36 do not ride against the trailing edge 34 of the indentations 28.

The inner race 18 may rotate in one direction relative to the outer race, in a clockwise direction as illustrated in FIGURE 1, since the rollers are free to rotate between the inner race 18 and the outer race 22 when disposed adjacent to the trailing edge 34 of the indentations 28.

However, the inner race 18 will not rotate relative to the outer race 22 for torques tending to rotate the inner race in the counterclockwise direction, as illustrated in FIGURE 1, since each of the rollers 36 will wedge between the flat surface 30 of its confronting indentation 28 and the cylindrical surface 24 of the outer race 22.

The inner race 18 is mounted on the outer race 22 by a pair of ball bearing assemblies 54 and 56 which are disposed in a pair of rectangular coaxial grooves 58 disposed in the inner race 18 on opposite sides of the roller bearing cage 38. The ball bearing assembly 54 engages a similar groove 60 in a flange portion 62 of an end ring 64, and the ball bearing assembly 56 likewise engages a mating groove 66 in the flange portion 68 of a second end ring 70. The end rings 64 and 70 are disposed on opposite sides of the outer race 22, and are mounted and secured in position by a plurality of bolts 74 which extend through bores 76 disposed parallel to the axis of the outer race and adjacent to the periphery thereof. The bolts 74 are slidably disposed within the bores 76, and nuts 78 disposed at both ends of each of the bolts 76 compress the two end rings 64 and 70 against the end surfaces of the outer race 22.

The outer race 22 is provided with a coaxial recess 80 on each of its end surfaces inwardly from the bolts 74 and adjacent to the roller bearing assembly 38. Each of the end rings 64 and 70 has a coaxial rib 82 which extends into the recess 80, but a space 84 is disposed between the rib 82 of each of the end rings 64 and 70 and the confronting surface of the coaxial indentation 80. As a result, only the portion of the surface of the end rings 64 and 70 outwardly from the ribs 82 need be ground to a flat surface and only the portion of the outer race 22 outwardly from the groove 80 need to be ground to a mating flat surface to assure proper engagement of the outer race 22 with the end rings 64 and 70.

A bore 86 extends through the lower portion of the outer race 22, and a liquid level guage 88 is connected to the bore 86. Also, a drain plug 90 is mounted in the bore 86 to permit draining of liquid lubricant. The liquid lubricant is introduced between the inner and outer races through a second bore 92 in the upper portion of the outer race, and an oil breather 94 is mounted in the bore 92 thereafter. The level of the liquid lubricant in the one-way brake is maintained sufficiently high to permit each roller to be thoroughly lubricated as it passes the lower portion of the outer race 22, but is not permitted to be excessively high to result in heating and friction.

The flange portion 62 of the end ring 64 and the flange portion 68 of the end ring 70 are provided with coaxial grooves 91 in the outer surfaces thereof which accommodate a lip 93 of a cover plate 95. A sealing ring 97 is also coaxially disposed between each flange portion 62 and 68 and the inner race 18.

The arm 12 which extends from the one-way brake 10 to the anchor 14 has the cross section of the letter I and is generally referred to as an I-beam and designated 96. The I-beam 96 has a web 98 which extends between a pair of parallel end plates 99, terminating at their opposite edges in relatively narrow flat surfaces 100. The I-beam 96 is provided with two circular openings 102 disposed in the web 98 along its central axis, and a sleeve 104 with a central channel 106 is mounted and secured, as by welding, in each of the openings 102. Each of the sleeves 104 has a length slightly longer than the length of the plates 99 and the opposite ends of the sleeves 104 are disposed in planes disposed on the remote sides of the planes of the flat surfaces 100 from the web 98.

A first mounting plate 110 is disposed in abutment with one end of each sleeve 104 and spaced from one edge of each of the plates 99 of the I-beam 96, and a second mounting plate 112 is disposed in abutment with the other end of each sleeve 104 and spaced from the other edge of each of the plates 99. The mounting plates 110 and 112 have apertures 114 aligned with both of the sleeves 104, and a bolt 116 extends through the apertures 114 and each of the sleeves 104. The ends of the bolts are threaded and carry nuts 117 which securely mount the mounting plates 110 and 112 on the sleeves 104.

One end of the I-beam 96 is mounted in the anchor 14 which has two spaced channel members 118 and 120. The channel members are spaced from each other by a distance greater than the distance between the remote surfaces of the plates 99 of the I-beam 96, so that a space or gap 122 is disposed between the channel members 118 and 120 in the I-beam 96. This space or gap permits the I-beam to move along its longitudinal axis in response to deviations in the alignment of the shaft 16 with its supporting bearings, not shown. As a result, the backstop does not exert a force on the shaft 16 which will increase the wear to the supporting bearings of the shaft or brake.

The ends of the mounting plates 110 and 112 remote from the anchor 14 are provided with a circular opening 124 with a radius of curvature slightly greater than the radius of curvature of the flange portion 68 of the end plates 64 and 70. The mounting plates 110 and 112 are provided with a plurality of bores 126 which are equally spaced about the circular opening 124 and aligned with the bores 76 in the outer race 22. The bores 126 also slidably accommodate the bolts 74, and the end nuts 78 of the bolts 74 secure also the mounting plates 110 and 112 on the outer race 22 of the one-way brake 10. In the particular construction, there are twelve equally spaced bolts 74 which secure the rings 64 and 70 and the mounting plates 110 and 112 on the outer race 22 of the one-way brake, and these bolts are equally spaced about the perimeter of the outer race 22. It is to be noted that the mounting plates 110 and 112 make no frictional contact with the I-beam 96 and are secured thereto only by the bolts 116, and as a result it is only the shear strength of the bolts and the friction between the mounting plates 110 and 112 and the ends of the sleeves 104 that maintain the mounting plates in association with the I-beam 96.

The two bolts 116 which mount the mounting plates 110 and 112 on the sleeves 104 are designed to shear at a lesser force than will cause failure of any other part of the one-way backstop. For example, the bolts 74 which hold the mounting plates 110 and 112 on the outer race 22 of the one-way brake 10 are designed to shear only at a higher torque than will produce shearing of the bolts 116. As a result, an overload applied to the backstop will shear the bolts 116 and release the mounting plates 110 and 112, thus protecting the one-way brake 10 itself and the anchor 14 from damage due to the application of a load in excess of the design of the backstop. In practice, the bolts 116 are designed to shear at approximately twenty percent less torque than any other part of the one-way backstop. Failure of the bolts 116 will permit the mounting plates 110 and 112, and one-way brake outer race 22 to rotate with the shaft 16. The mounting plates 110 and 112 may be once again mounted on the I-beam 96 by inserting new bolts 116 and anchoring them with nuts 117.

Further, if one of the bolts 116 shears, the I-beam 96 will pivot on the other bolt and cause the end of the I-beam opposite the anchor, designated 127, to contact the exterior surface 26 of the outer race 22, thereby placing all of the strain on the remaining bolt 116 to cause it also to fail. Therefore, the long I-beam 96 which may be from four to eight feet in length in actual practice, will not revolve freely in the air and create a dangerous situation both to men and to equipment. Further, it is clear that the means by which the mounting plates 110 and 112 are mounted on the I-beam 96 must fail if an overload is impressed upon the backstop before any portion of the one-way clutch 10. For this reason, the arcs enscribed by the end edges 127 of the I-beam 96 confronting the outer race 22 from centers located on the axis of each of the bolts 116 must traverse the external cylindrical surface 26 of the outer race 22. The dashed line 129 of FIGURE 1 illustrates this arc centered on the bolt 116 remote from the outer race 22. This contact will shear the remaining bolt 116 to break all connection between beam 96 and plates 110 and 112. It is to be noted that the end of the I-beam 96 confronting the outer race 22 has a central indentation in order to minimize the angle of the I-beam 96 which will produce contact of one edge 127 with the outer race 22.

FIGURE 5 illustrates an improved construction of a one-way brake for use in applications other than backstops which takes advantage of the elimination of tapped bolts in the outer race in the manner of the backstop set forth above. In this embodiment of the invention, the brake is designated 130 and has an inner race 132 mounted coaxially about a shaft 134. The brake 130 also has an outer race 136, and a plurality of spaced rollers 138 mounted in a yoke 140. The construction of the yoke 140 is identical to that previously described, and the inner race 132 is also constructed similar to that previously described in that the external surface contains inclined plane indentations. Inner race 132, however, is mounted on a sleeve 142 which is mounted on the shaft 134 and meshed by means of gear teeth 144 therewith. This construction of a one-way brake is clearly shown in Patent No. 3,058,556 of Joseph A. Marland dated October 16, 1962, and entitled "Transmission."

In the foregoing patent, the outer race 136 is also mounted on a ring 146 at one end thereof, and the ring 146 carries a load, such as a hub 148 which is mounted thereto by means of bolts 150 anchored within threaded bores 152. In accordance with the present invention, the outer race 136 is provided with an outwardly extending flange 154 which abuts against the ring 146, and mating apertures 156 and 158 disposed in the ring 146 and flange 154 accommodate a bolt 159 which is threaded at its ends and carries nuts 160. In this manner, it is not necessary to employ tapped bores in the outer race 136 itself, and forces are transmitted from the outer race through the bolts 159 to the ring 146.

The total support for the outer race 136 is provided by the flange 154 thereof and the ring 146, and it is only necessary to seal the end of the outer race 136 opposite the ring 146 by a cover 162 which is circular in shape and has an outer diameter approximately equal to the inner diameter of the outer race 136. The cover 162 also has an axial opening 164 which is disposed about the shaft 134. The end of the cover 162 remote from the shaft 134 includes a flange 166 which extends inwardly adjacent to the inner surface of the outer race 136, and an O-ring 168 disposed within a coaxial groove 170 seals the cover against the passage of lubricant from the region of the rollers 138. The outer race has a coaxial groove 172 adjacent to its end opposite the ring 146, and a snap ring 174 is disposed within this groove to retain the cover 162 in position.

Those skilled in the art may readily device many modifications of the present invention from the teachings of this disclosure. It is therefore intended that the scope of the present invention be not limited by the foregoing disclosure, but rather only by the appended claims.

The invention claimed is:

1. In combination, a one-way brake comprising a cylindrical inner race adapted to engage a drive shaft, a cylindrical outer race coaxially disposed about said inner race and having walls at the ends thereof normal to the axis thereof, and means disposed between said inner and outer races for locking the inner race to the outer race on rotation of said shaft in one direction of rotation and releasing the inner race from the outer race on rotation of said shaft in the reverse direction; and an anchoring mechanism comprising a pair of parallel arms, each of said end walls of said outer race being affixed to one of the arms, and the arms extending outwardly from the axis of the outer race, an elongated beam having one end adapted to be anchored and the other end disposed between the arms, said beam extending further from the brake than the arms, means connecting said beam to said arms comprising connectors of lesser shear strength than the remaining components in said one-way brake, whereby the connection between said arms and said beam will rupture on the application of torque to said shaft in the first direction in an amount greater than the shear strength of said connectors.

2. The combination as claimed in claim 1, wherein said connectors comprised a plurality of bolts disposed parallel to the shaft axis along the length of the beam and extending through said arms and said beam.

3. The combination as claimed in claim 2, wherein the outer race has a cylindrical external surface and the beam has an end disposed adjacent to the cylindrical surface of the outer race provided with an edge on the end displaced from the longitudinal axis of the beam, the bolts extending through the beam along the longitudinal axis thereof and the distance between each bolt and the adjacent surface of the outer race being less than the distance between said bolt and the edge of the beam.

4. A backstop comprising, in combination, a one-way brake having an outer race with a cylindrical inner surface and flat end disposed normal to the axle of said inner surface, an inner race disposed within the outer race and having an axial channel adapted to engage a shaft along its axis, said inner race having a plurality of indentations confronting the surface of the outer race with flat inclined planes, a roller disposed in each indentation with its axis parallel to the axis of the inner race, rotational torque between the inner and outer races in one direction wedging the rollers between the inclined planes and the cylindrical surface of the outer race and rotational torque in the opposite direction releasing the rollers for rotation about their axes, said outer race having a plurality of spaced channels disposed about the axis thereof parallel to the axis of the outer race and extending therethrough, a flat cover plate disposed in abuttment with each end of the outer race having a central opening aligned with the axial channel of the inner race, each cover plate having an aperture confronting each channel of the outer race, a bolt extending through each channel and the confronting apertures in the cover plates, each bolt being threaded at its ends, a nut threadedly engaging each end of each bolt and compressing the cover plates and outer race, an annular bearing assembly mounted on each cover plate coaxially about the inner race, each bearing assembly also being mounted on the inner race, and a load carrying assembly having a flat yoke disposed between each cover plate and the confronting nuts, said yokes having apertures aligned with the channels in the outer race and accommodating the bolts in said channels, an elongated I-beam disposed between the yokes having a web extending perpendicularly between a pair of flat elongated plate portions, the opposite edges of each plate portion being disposed adjacent to the yokes and the web having a plurality of orifices extending therethrough along the longitudinal axis of the web, a sleeve disposed in each of the orifices and mounted normally on the web, opposite ends of each sleeve abutting the two yokes and each of the yokes having an aperture aligned with each of the sleeves, a shaft threaded at its ends extending through each of the sleeves and the confronting apertures in the yokes, and a nut threaded on each end of each of the shafts engaging the yokes and compressing the yokes on the ends of the sleeves.

5. A backstop mechanism for use in combination with a one-way brake in which said clutch is coupled to a drive shaft comprising a cylindrical inner race connected drivingly to said shaft, said inner race having a plurality of indentations in the outer surface thereof with flat inclined planes, a cylindrical outer race coaxially disposed about said inner race, and a roller assembly interposed between said inner and outer races, said roller assembly having a roller disposed in each indentation with its axis parallel to the axis of the inner race, rotational torque between the inner and outer races in one direction wedging the rollers between the inclined planes and the cylindrical surface of the outer race and rotational torque in the opposite direction releasing the rollers for rotation about their axes, annular cover members disposed on either end of said roller assembly and secured to said outer race end walls; said backstop mechanism comprising plate members affixed securely to each of said cover members, said plate members extending mutually in parallel in a direction radial to said brake, said plate members having side walls converging a radial distance from said brake, a beam extending radially away from said brake and affixed at its near end between said plate members, the remote end of said beam anchored to prevent excess movement of said beam remote end, said beam comprising a vertically disposed I-beam with top and bottom parallel plates adjacent against said plate members, means for affixing said plate members to said beam including a plurality of bolts extending through the web of said I-beam and through said plate members, and means holding said bolts securely against said plate members to confine the I-beam therebetween, said bolts constructed of material of lower sheer strength than the other elements in said combination whereby said bolts will rupture on the application of torque to said shaft to cause rotation in said first direction, wherein the amount of torque transmitted is greater than the individual sheer stresses of said bolts.

6. A mechanism as claimed in claim 5, in which said affixing means comprise two bolts each attending parallel to the axis of said shaft and spaced apart centrally along the web of said I-beam, and in which the radial distance from each of said bolts to the most distant tip of the near end of the beam is lesser than the distance from that bolt to the adjacent outer periphery of said outer race, whereby on rupture of one of said bolts, the other of said bolts will pivot about the remaining bolt to drive the near end of the I-beam into contact with the outer periphery of the outer race to rupture the remaining bolt and sever the connection between the plate members and the I-beam completely.

7. In combination, a one-way brake comprising a generally cylindrical inner race adapted to engage a drive shaft, a cylindrical outer race coaxially disposed about the inner race, means disposed between the inner and outer races for locking the inner race to the outer race on rotation of said shaft in one direction of rotation and releasing the inner race from the outer race on rotation of said shaft in the reverse direction of rotation; and an anchoring mechanism comprising a pair of parallel arms mounted at one end on the outer race and extending therefrom parallel to each other in planes normal to the axis of the outer race, an elongated beam having one end adapted to be anchored and the other end disposed between the arms, said beam extending further from the brake than the arms, means connecting said beam to said arms comprising a connector of lesser shear strength that the remaining components of said one-way brake, whereby the connection between said arms and said beam will rupture on the application of torque to said shaft in said one direction in an amount greater than the sheer strength of said connectors.

References Cited by the Examiner

UNITED STATES PATENTS

| 792,567 | 6/1905 | Wright | 188—82.84 |
| 2,061,866 | 11/1936 | De La Mater | 188—90 |
| 2,300,233 | 10/1942 | Hottenroth | 188—82.84 X |
| 2,544,969 | 5/1951 | Williams. | |
| 2,865,474 | 12/1958 | Marland. | |
| 3,000,577 | 9/1961 | Fergeson | 64—28 X |

FOREIGN PATENTS 774,016   5/1957   Great Britain.

MILTON BUCHLER, *Primary Examiner*

EUGENE G. BOTZ, ARTHUR L. LA POINT,
*Examiners.*

UNITED STATES PATENT OFFICE
CERTIFICATE OF CORRECTION

Patent No. 3,236,337                          February 22, 1966

Joseph A. Marland et al.

It is certified that error appears in the above identified patent and that said Letters Patent are hereby corrected as shown below:

Column 1, lines 53 and 60, and column 6, line 75, "clutch", each occurrence, should read -- brake --. Column 1, line 65, "ish" should read -- is --.

Signed and sealed this 20th day of January 1970.

(SEAL)
Attest:

Edward M. Fletcher, Jr.                      WILLIAM E. SCHUYLER, JR.
Attesting Officer                                Commissioner of Patents